United States Patent [19]
Kageyama et al.

[11] Patent Number: 5,819,122
[45] Date of Patent: Oct. 6, 1998

[54] CAMERA

[75] Inventors: Naohiro Kageyama, Sakai; Kimihiko Nakamura, Toyonaka, both of Japan

[73] Assignee: Minolta Co., Ltd., Osaka, Japan

[21] Appl. No.: 864,484

[22] Filed: May 28, 1997

[30] Foreign Application Priority Data

May 31, 1996 [JP] Japan .................................. 8-160918

[51] Int. Cl.⁶ ...................................................... G03B 3/10
[52] U.S. Cl. ............................ 396/85; 396/131; 396/298
[58] Field of Search ..................... 396/85, 131, 297–300, 396/87, 86

[56] References Cited

U.S. PATENT DOCUMENTS 5,291,236  3/1994  Ohsawa et al. .

Primary Examiner—W. B. Perkey
Attorney, Agent, or Firm—Burns, Doane, Swecker & Mathis, LLP

[57] ABSTRACT

When CPU 2 is in the standby state, switch S4 is turned OFF such that switch S1 is not connected to condenser C1 and the signals from switch S1 are pulled up by means of resistor R2. When CPU 2 becomes activated through the detection of a change in the state of switch S1, switches S3, S4 and S5 are turned ON to connect condenser C1 and resistor R1 to switch S1 and to connect resistor R3 to switch S2. Through this construction, the chattering in switches S1 and S2 may be eliminated, and CPU 2, which is in a standby state, may be activated based on signals from switch S1.

20 Claims, 4 Drawing Sheets

CAMERA

BACKGROUND OF THE INVENTION

1. Field of the Invention

The present invention pertains to a camera that detects the operation of a certain operation member, and more particularly to a technology for the control of operation members for power focusing, power zooming and the setting of various values.

2. Description of the Related Art

Conventionally, control for manual focusing or zooming in a camera has been carried out using either a mechanical control method, in which the lens drive is controlled by means of a mechanical construction, or an electric control method, in which the lens drive is controlled by means of electrically detecting the ON/OFF state of an operation switch that issues an instruction regarding the direction in which the lens should be moved (power focusing, power zooming, etc.).

Where the electric control is used, particularly where precision drive control is required, it is necessary to repeatedly turn ON and OFF the operation switch many times because there is no other way to perform adjustment, making this control more difficult in terms of operability and less easy to use than the mechanical control. An operation switch is also prone to chattering.

Therefore, where an electric control is employed, a special switch is used to obtain better operability, and software processing is used in order to eliminate the effect of chattering from the operation switch, in addition to a circuit and a special microcomputer for the software. Specifically, a method has been proposed in which a rotatable operation ring is located in the lens part in place of an operation switch and two-phase pulses are output when the user rotates this operation ring, based on which signals a microcomputer detects the amount of movement of the operation ring, so that a level of operability equal to that of the mechanical control may be obtained.

However, using conventional manual focusing control as described above, if the mechanical control is taken, it is necessary to make the mechanical construction inside the lens part large in order to ensure a construction equipped with the functions needed for focusing control. If an electric control is employed, on the other hand, it is necessary to eliminate chattering from the two-phase pulse signals, as described above, but in doing so, particularly during focusing in which operation takes place quickly, because high-frequency two-phase pulses are output and precision is required for the detection of the signals, it is difficult to accurately eliminate the chattering by means of software processing.

SUMMARY OF THE INVENTION

The present invention was made to resolve the problems described above. Its object is to provide a camera that does not require a special mechanical construction and that permits easy-to-use control for power focusing, etc., without placing demands on the software and using a simple circuit construction.

Another object of the present invention is to resolve the problems described above and to provide a detection device that accurately detects the operation of the operation member using a simple circuit construction and reduces wasteful power consumption.

In order to achieve said objectives, the camera of the present invention comprises an operation member that is manually operable; an input terminal that detects the electric potential that is input to said terminal; an electric circuit including a first switch that is located between and connected to the ground and said input terminal and that turns ON and OFF in response to the operation of said operation member, a first serial unit in which a first resistor having a prescribed resistance and a second switch are constructed in series and are located between and connected to said input terminal and the power supply, a second resistor that is located between and connected to said input terminal and the power supply and that has a higher resistance than said first resister, and a second serial unit in which a condenser and a third switch are constructed in series and that is located between and connected to said input terminal and the ground; and a controller that turns OFF said second and third switches when there is no change in the electric potential of said input terminal and that turns ON said second and third switches when there is a change in the electric potential of said input terminal.

Using the construction described above, if there is no change in the electric potential of the input terminal, the second and third switches are turned OFF. If there is a change in the electric potential of the input terminal, the second and third switches are closed by the controller. The condenser then comes to be located between and connected to the input terminal and the ground, through which noises such as the chattering that occurs in the ON/OFF signals of the first switch may be eliminated by means of the condenser.

Another camera of the present invention comprises an operation member that is manually operable; a first input terminal that detects the electric potential that is input to said first input terminal; a first switch that is located between and connected to the ground and said first input terminal and that turns ON and OFF in response to the operation of said operation member; a first serial unit in which a first resistor having a prescribed resistance and a second switch are constructed in series and that is located between and connected to said first input terminal and the power supply; a second resistor that is located between and connected to said first input terminal and the power supply and that has a higher resistance than said first resistor; a second serial unit in which a first condenser and a third switch are constructed in series and that is located between and connected to said first input terminal and the ground; a second input terminal that detects the electric potential that is input to said second input terminal; a fourth switch that is located between and connected to said second input terminal and the ground and that turns ON and OFF as said first switch turns ON and OFF; a third serial unit in which a third resistor having a prescribed resistance and a fifth switch are constructed in series and that is located between and connected to said second input terminal and the power supply; a fourth serial unit in which a second condenser and a sixth switch are constructed in series and that is located between and connected to said second input terminal and the ground; and a controller that turns OFF said second, third, fifth and sixth switches when there is no change in the electric potential of the first or second input terminals and that turns ON said second, third, fifth and sixth switches when there is a change in the electric potential of the first input terminal.

Using the construction described above, when there is a change in the electric potential of the first input terminal, the first and second condensers come to be connected to the first and second input terminals, respectively, through which noises such as the chattering that occurs in the signals from the first and second switches may be eliminated by means of the first and second condensers.

The detection device of the present invention comprises a first switch that turns ON and OFF in response to the operation of a prescribed operation member; a second switch that turns ON and OFF in response to the operation of said operation member; a first input terminal to which said first switch is connected and to which the state of the first switch is input; a second input terminal to which said second switch is connected and to which the state of the second switch is input; and a controller that makes only said first input terminal operable when there is no change in the first or second switches and that makes both said first and second input terminals operable when there is a change in the first switch.

Using the construction described above, when there is no change in the first or second switches, only the first input terminal is made operable, and when there is a change in the first switch, the first and second input terminals are made operable, through which power consumption may be reduced when there is no change in the state of the switches.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1A:
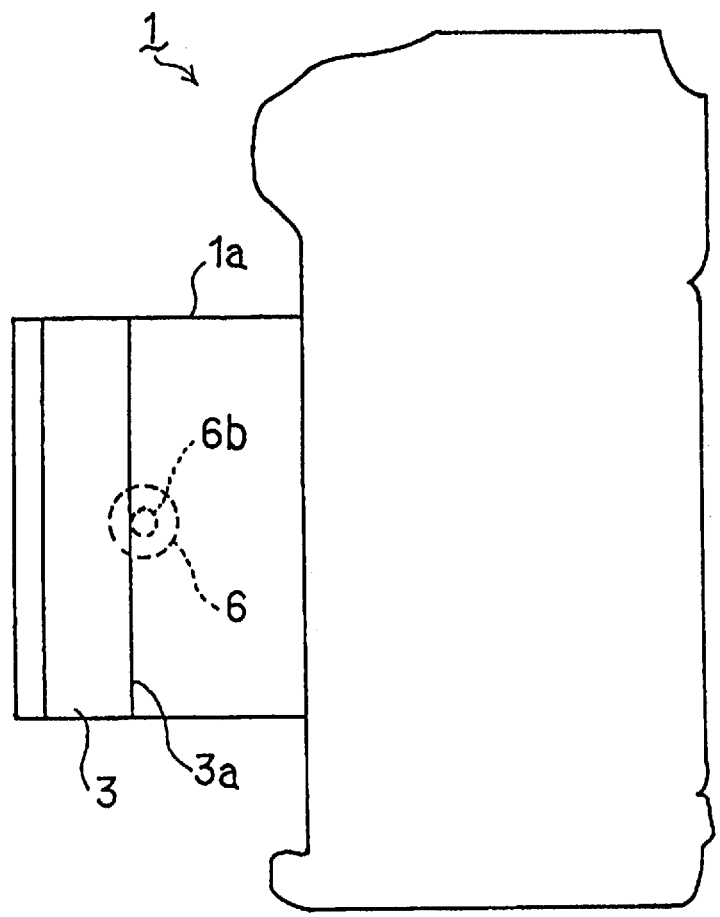
FIG. 1A shows a side elevation of the camera pertaining to one embodiment of the present invention.
Figure 1B:
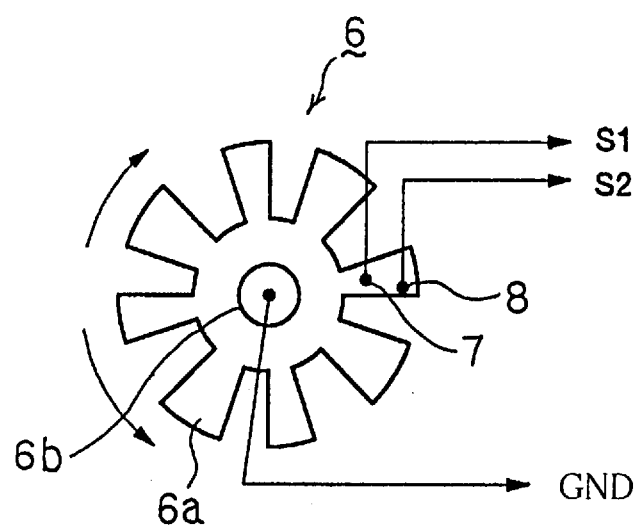
FIG. 1B shows a construction for detecting the operation of an operation ring located in the lens part of the camera.
Figure 2:
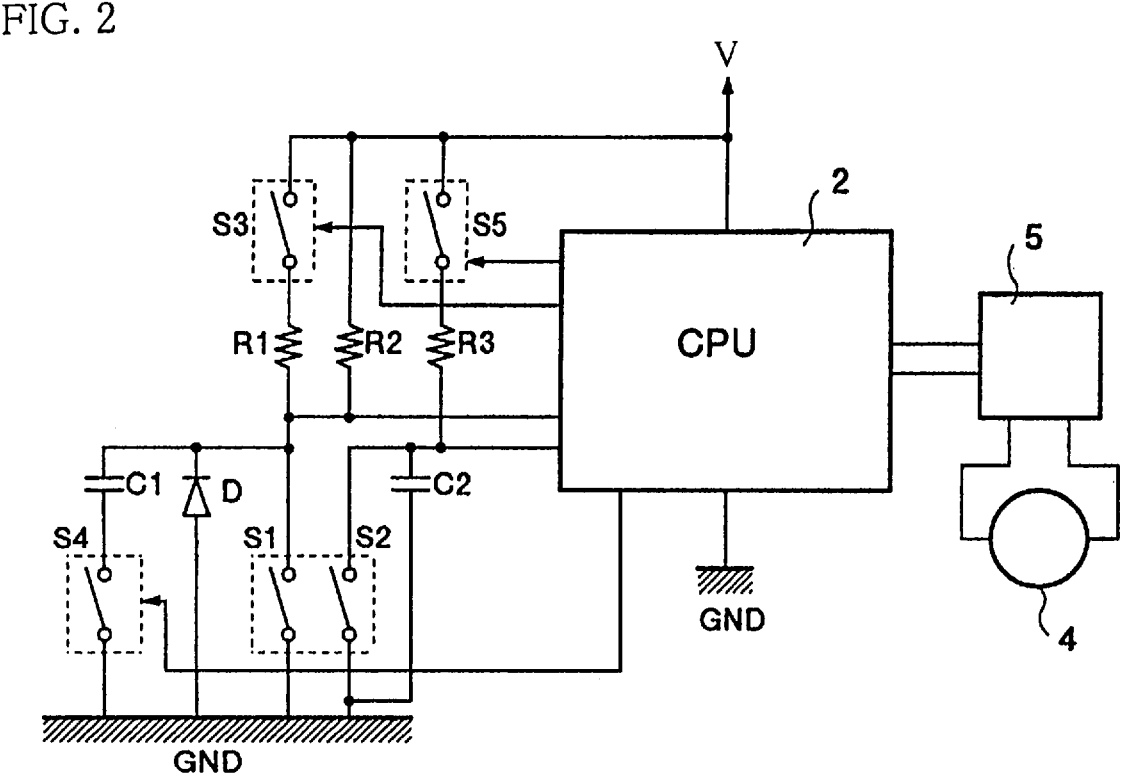
FIG. 2 is a block diagram of the control circuit that performs control for manual focusing in the camera.

The camera pertaining to one embodiment of the present invention will be explained below with reference to the drawings. FIG. 1A is a side elevation of the camera, and FIG. 1B shows a construction for detecting the operation of an operation ring located in the lens part of the camera. FIG. 2 is a block diagram of the control circuit that performs control for manual focusing in the camera. This control circuit will first be explained. This control circuit is equipped with microcomputer (CPU) 2 that serves as a control means to control the operation of the entire camera 1. Connected to this CPU 2 are switches S1 and S2 that are opened or closed as operation ring 3 located in the camera's lens part is turned, and their states are monitored by CPU 2.

The turning ON and OFF of switches S3, S4 and S5 (the functions of these switches are described below) is controlled by CPU 2. Driver 5 that supplies power to motor 4 that drives the lens during focusing is also connected to and controlled by CPU 2.

Switches S1 and S2 are switches that are operated by the user turning the operation ring. One end of switch S1 is grounded while resistor R1 having a resistance of several kilo-ohm through several tens of kilo-ohm and resistor R2 having a resistance of several mega-ohm are serially located between and connected to the other end of switch S1 and power supply V, respectively. One end of switch S2 is grounded, while resistor R3 having a resistance of several kilo-ohm through several tens of kilo-ohm is located between and connected to the other end of switch S2 and power supply V. Further, diode D is connected to switch S1 in parallel and condenser C1 having a capacitance of 0.01 $\mu$F through 1 $\mu$F is also connected to switch S1 in parallel. Condenser C2 having a capacitance of 0.01 $\mu$F through 1 $\mu$F is connected to switch S2 in parallel. The turning ON and OFF of switches S3, S4 and S5 is controlled by CPU 2 as described above. Switch S3 connects and disconnects resistor R1 and circuit power supply V. Switch S4 connects and disconnects condenser C1 and the circuit GND. Switch S5 connects and disconnects resistor R3 and circuit power supply V.

Operating ring 3 will now be explained. Operating ring 3 is located in lens part 1a as shown in FIG. 1A. It is a switching mechanism that generates signals to electrically move lens 1a during manual focusing. This operation ring 3 controls the generation of pulse signals by means of the repeated turning ON and OFF of switches when being turned by the user. The user may operate this operation ring with the same ease of use as a conventional mechanical operation ring.

Inside operation ring 3 is located conductive rotational blade unit 6 as shown in FIG. 1B. This rotational blade unit 6 comprises blades 6a and gear 6b that is formed in the center of the rotational blade unit 6. Blades 6a rotate in response to the degree of rotation (amount of movement) of operation ring 3 by means of this gear 6b engaging with gear 3a that is formed on the side of operation ring 3. The center of rotational blade unit 6 is electrically connected to ground GND of the camera body. Blades 6a come into contact with brushes 7 and 8 such that they may move past the brushes 7 and 8. When blade 6a comes into contact with brushes 7 or 8 due to the rotation of rotational blade unit 6, switches S1 or S2 become ON, and when blade 6a leaves the brushes 7 or 8, switches S1 or S2 become OFF. Through this construction, when the user operates operation ring 3, two-phase pulses are output and the degree of rotation of operation ring 3 is detected from these signals. CPU 2 controls driver 5 and drives motor 4 in accordance with the result of this detection. In FIG. 1B, the locations (phases) of brushes 7 and 8 do not coincide with each other, such that the direction of rotation of rotational blade unit 6 may be detected from the phase difference of two pulse signals.

Figure 3:
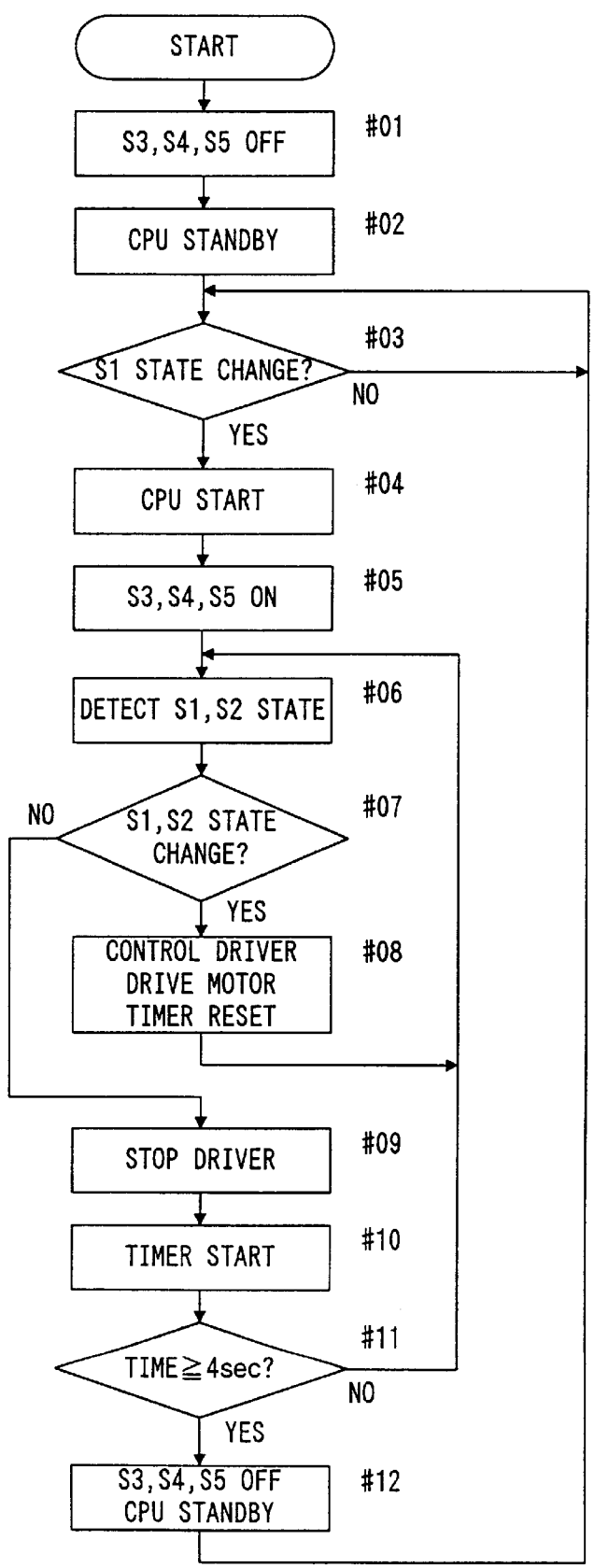
FIG. 3 is a flow chart showing the control sequence for manual focusing.
Figure 4:
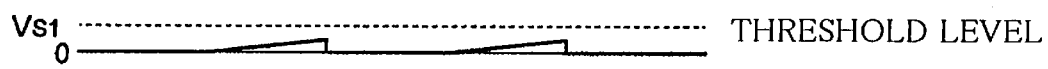
FIG. 4 shows the waveform of signals from switch S1 when a condenser is connected to switch S1.
Figure 5:
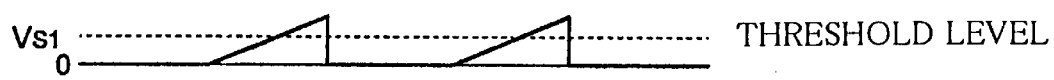
FIG. 5 shows the waveform of signals from switch S1 when switch S1 is pulled up with high resistance.
Figure 6:
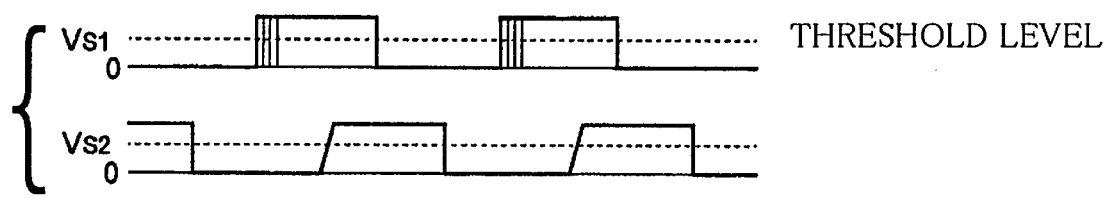
FIG. 6 shows the waveforms of signals from switches S1 and S2 when chattering is not eliminated.
Figure 7:
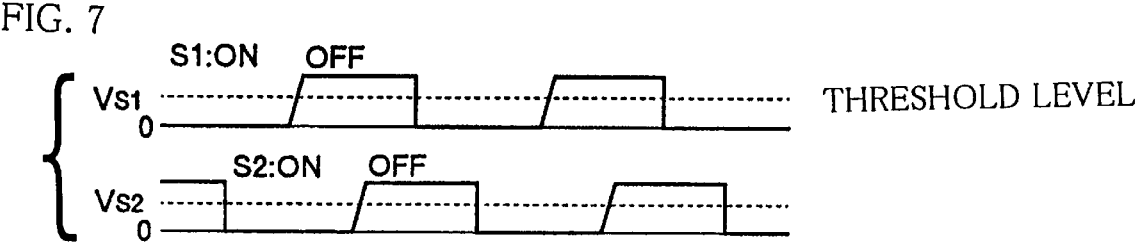
FIG. 7 shows the waveforms of signals from switches S1 and S2 when chattering is eliminated by means of condensers.
Figure 8:
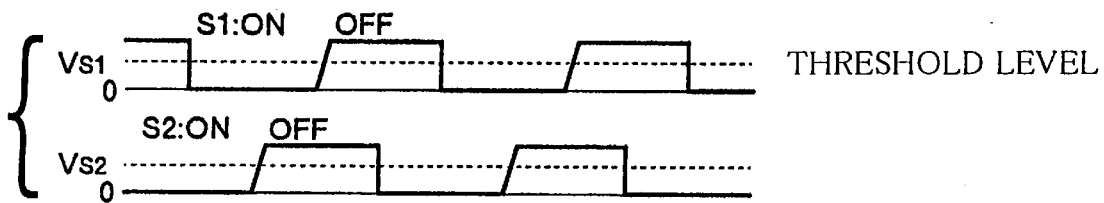
FIG. 8 shows the waveforms of signals from switches S1 and S2 when the operation ring is operated in the direction opposite from that shown in FIG. 7.

The control sequence for manual focusing by camera 1 will now be explained with reference to the flow chart of FIG. 3 and the signal waveforms of FIGS. 4 through 8. In FIGS. 4 through 8, VS1 and VS2 indicate the electric potentials of the input terminals of CPU 2 to which switches S1 and S2 are connected, respectively. In the initial condition, switches S3, S4 and S5 are OFF in order to reduce power consumption (step #01). Switches S3 and S5 are turned OFF because resistors R1 and R3 have only a small resistance of several kilo-ohm through several tens of kilo-ohm, and therefore if switches S3 and S5 were kept ON, a large amount of electric current would flow with switches S1 and S2 ON. Switch S4 is turned OFF for the following reason: Since resistor R2 has a large resistance of several mega-ohm, when condenser C1 is connected, operability (response) during focusing would deteriorate because up to a full second would be required for a change to occur in the terminal of CPU 2 when switch S1 turns OFF from ON, and where lens 1a is to be moved by as much as several pulses, the next pulse would be input to the terminal of CPU 2 to which switch 1 is connected before the input electric potential for CPU 2 changes (before it reaches the threshold level), preventing the detection of normal pulses.

In addition, CPU 2 is in a standby state until the user operates operation ring 3, and therefore its functioning has stopped (step #02). This is done in order to prevent wasteful power consumption. The state of switch S1 is monitored in order to detect the operation of operation ring 3 by the user (step #03). If the user does not operate operation ring 3 and the state of switch S1 accordingly does not change, monitoring of the state of switch S1 continues (NO in step #03). If operation ring 3 is operated and the state of switch S1 changes, an interrupt occurs due to this change in the state of switch S1 and CPU 2 becomes activated (step #04). The waveform for switch S1 at this time will look like that shown in FIG. 5 as a result of the pulling-up caused by resistor R2 which has a large resistance and because it is influenced by the capacitance of the wiring.

When CPU 2 is activated in step #04 to start control for focusing, switches S3, S4 and S5 are turned ON in order to determine the states of switches S1 and S2 (step #05). As a result, the terminal voltages of switches S1 and S2 are pulled up by means of resistors R1 and R3, respectively, and signals may be generated. When switch S1 is closed, condenser C1 may eliminate the chattering of the signals from switch S1 by means of time constant (C1·R1) of resistor R1 and condenser C1. If condenser C1 were not connected to switch S1, chattering would occur in the signals from switch S1, which would prevent accurate focusing control. In addition, if for some reason a charge of the opposite polarity is remaining in condenser C1 when switch S4 turns ON, the charge is released through diode D.

The chattering that occurs in the signals from switch S2 are also eliminated in the manner described above, by means of condenser C2 being connected to switch S2 in parallel.

The states of switches S1 and S2 are then monitored for focusing control (step #06), and CPU 2 changes its control depending on the states of switches S1 and S2 (step #07). Where operation ring 3 was operated and the states of switches S1 and S2 have changed (YES in step #07), the waveforms shown in FIG. 7 or 8 occur, in which there is a phase difference between the two signals depending on the direction of operation of operation ring 3 (direction of rotation). CPU 2 drives the focusing lens based on these signals (step #08). In this step #08, driver 5 is controlled by CPU 2 to drive the focusing lens. In this control, the number of pulses changes depending on the amount by which operation ring 3 was operated, and the amount and speed of movement of the focusing lens is changed based on the number of pulses. This sequence continues until the states of switches S1 and S2 no longer change. Motor 4 thereby rotates and the focusing lens is driven. A timer that counts the time until CPU 2 enters the standby state is also reset.

Where the states of switches S1 and S2 have not changed in step #07 (NO in step #07), the control of driver 5 is stopped to stop focusing (step #09). CPU 2 is set such that it also stops functioning to reduce power consumption when driver control does not take place within a prescribed period of time (it enters the standby state). Now that there are no changes in the states of switches S1 and S2 and driver control has been completed, time counting starts by a timer not shown in the drawings (step #10). The time counted by the timer is then determined (step #11), and if the timer has counted a prescribed period of time, i.e., if four seconds or more have elapsed, for example, (YES in step #11), CPU 2 stops functioning to reduce power consumption and switches S3, S4 and S5 are turned OFF in preparation for the reactivation of CPU 2 (step #12). The program then returns to step #03.

As described above, using camera 1 of this embodiment, the chattering that occurs when the states of switches S1 and S2 change through the operation of operation ring 3 is eliminated by means of condensers C1 and C2. When operation ring 3 is operated at high speed and high-frequency two-phase pulses are output, such as during focusing in particular, the chattering that occurs in the pulse signals may be eliminated with high accuracy by using the circuit construction described above. Therefore, the driving of the focusing lens becomes smooth, enabling the user to easily perform focusing.

In addition, while CPU 2 is in the standby state, switch S4 is turned OFF such that condenser C1 may not be connected. Therefore, the signals from switch S1 are pulled up due to resistor R2, so that the CPU 2 terminal may be changed quickly.

The present invention is not limited to the embodiment described above, and may be implemented in various other forms. For example, the control described above is carried out with regard to manual power focusing in the embodiment shown above, but it may be applied in manual power zooming as well. It may also be applied in an information setting dial such as a shutter time setting dial. In the embodiment described above, switch S4, used for condenser C1 that is connected to switch S1 in parallel, and high-resistance resistor R2 for pulling-up are used only with regard to switch S1 and such a construction is not used for switch S2, but this is only because CPU 2 is activated through the detection of a change in the state of switch S1. Where CPU 2 is activated based on a change in the state of switch S2, the same measures may be taken for switch S2. For switches S3, S4 and S5, switching elements such as transistors and FETs may be employed. In addition, while motor 4 is used to drive the lens in the embodiment shown above, an actuator such as a piezoelectric element may be used instead.

In the circuit construction shown in FIG. 2, condenser C2 is located between and connected to CPU 2 and the ground without any switches. However, this connection may be made via a switch, such as that used for the connection of condenser C1. The same control as that used for switch S4 should be used for this switch as well.

Obviously, many modifications and variation of the present invention are possible in light of the above teachings. It is therefore to be understood that within the scope of the appended claims, the invention may be practiced other than as specifically described.

What is claimed is:

1. A camera, comprising:
   an operation member that is manually operable;
   an input terminal that detects the electric potential that is input to said terminal;
   an electric circuit including a first switch that is located between and connected to the ground and said input terminal and that turns ON and OFF in response to the operation of said operation member, a first serial unit in which a first resistor having a prescribed resistance and a second switch are constructed in series and are located between and connected to said input terminal and the power supply, a second resistor that is located between and connected to said input terminal and the power supply and that has a higher resistance than said first resister, and a second serial unit in which a condenser and a third switch are constructed in series and that is located between and connected to said input terminal and the ground; and a controller that turns OFF said second and third switches when there is no change in the electric potential of said input terminal and that turns ON said second and third switches when there is a change in the electric potential of said input terminal.

2. A camera as claimed in claim 1, further comprising a microcomputer which includes said input terminal and said controller.

3. A camera as claimed in claim 2, wherein said microcomputer enters standby state in which consumption of power is less than that in operating state when there is no change in the electric potential of said input terminal.

4. A camera as claimed in claim 1, wherein said operation member is a rotatable operation member.

5. A camera as claimed in claim 4, wherein said operation member is for moving a photo-taking lens.

6. A camera as claimed in claim 4, wherein said first switch turns ON and OFF continuously in response to the rotational operation of said operation member.

7. A camera, comprising:

an operation member that is manually operable;

a first input terminal that detects the electric potential that is input to said first input terminal;

a first switch that is located between and connected to the ground and said first input terminal and that turns ON and OFF in response to the operation of said operation member;

a first serial unit in which a first resistor having a prescribed resistance and a second switch are constructed in series and that is located between and connected to said first input terminal and the power supply;

a second resistor that is located between and connected to said first input terminal and the power supply and that has a higher resistance than said first resistor;

a second serial unit in which a first condenser and a third switch are constructed in series and that is located between and connected to said first input terminal and the ground;

a second input terminal that detects the electric potential that is input to said second input terminal;

a fourth switch that is located between and connected to said second input terminal and the ground and that turns ON and OFF as said first switch turns ON and OFF;

a third serial unit in which a third resistor having a prescribed resistance and a fifth switch are constructed in series and that is located between and connected to said second input terminal and the power supply;

a fourth serial unit in which a second condenser and a sixth switch are constructed in series and that is located between and connected to said second input terminal and the ground; and a controller that turns OFF said second, third, fifth and sixth switches when there is no change in the electric potential of the first or second input terminals and that turns ON said second, third, fifth and sixth switches when there is a change in the electric potential of the first input terminal.

8. A camera as claimed in claim 7, further comprising a microcomputer which includes said first and second input terminal and said controller.

9. A camera as claimed in claim 8, wherein said microcomputer enters standby state in which consumption of power is less than that in operating state when there is no change in the electric potential of the first or second input terminals.

10. A camera as claimed in claim 7, wherein said operation member is a rotatable operation member.

11. A camera as claimed in claim 10, wherein said operation member is for moving a photo-taking lens.

12. A camera as claimed in claim 10, wherein said first switch and fourth switch turn ON and OFF continuously in response to the rotational operation of said operation member.

13. A camera as claimed in claim 7, wherein phases of turning ON and OFF of said first switch and fourth switch are different from each other.

14. A detection device, comprising:

a first switch that turns ON and OFF in response to the operation of a prescribed operation member;

a second switch that turns ON and OFF in response to the operation of said operation member;

a first input terminal to which said first switch is connected and to which the state of the first switch is input;

a second input terminal to which said second switch is connected and to which the state of the second switch is input; and a controller that makes only said first input terminal operable when there is no change in the first or second switches and that makes both said first and second input terminals operable when there is a change in the first switch.

15. A detection device as claimed in claim 14, wherein said further comprising a microcomputer which includes said first and second input terminal and said controller.

16. A camera as claimed in claim 15, wherein said microcomputer enters standby state in which consumption of power is less than that in operating state when there is no change in the electric potential of the first or second input terminals.

17. A camera as claimed in claim 14, wherein said operation member is a rotatable operation member.

18. A camera as claimed in claim 17, wherein said operation member is for moving a photo-taking lens.

19. A camera as claimed in claim 17, wherein said first switch and fourth switch turn ON and OFF continuously in response to the rotational operation of said operation member.

20. A camera as claimed in claim 14, wherein phases of turning ON and OFF of said first switch and fourth switch are different from each other.

* * * * *